United States Patent [19]

Diegel et al.

[11] Patent Number: 4,694,188
[45] Date of Patent: Sep. 15, 1987

[54] APPARATUS FOR CONTROLLING A TURBO GENERATOR

[75] Inventors: Dieter Diegel, Rottenbach; Gerhard Plohn, Erlangen; Manfred Schuh, deceased, late of Erlangen, all of Fed. Rep. of Germany, by Gisela Schuh, Sabine Schuh, Michael Schuh, heirs

[73] Assignee: Siemens Aktiengesellschaft, Berlin and Munich, Fed. Rep. of Germany

[21] Appl. No.: 894,936

[22] Filed: Aug. 8, 1986

[30] Foreign Application Priority Data

Aug. 16, 1985 [DE] Fed. Rep. of Germany ....... 3529291

[51] Int. Cl.⁴ ............................................. G05B 11/06
[52] U.S. Cl. .................................. 290/40 B; 290/40 C
[58] Field of Search .................. 290/40 R, 40 B, 40 C

[56] References Cited

U.S. PATENT DOCUMENTS

| | | | |
|---|---|---|---|
| 3,601,617 | 8/1971 | De Mello et al. | 290/40 C |
| 4,287,429 | 9/1981 | Bashnin et al. | 290/40 C |
| 4,292,534 | 9/1981 | Diegel et al. | 290/40 R |
| 4,322,630 | 3/1982 | Mezera et al. | 290/40 C |
| 4,471,229 | 9/1984 | Plohn et al. | 290/40 R |
| 4,603,394 | 7/1986 | Bukowski et al. | 290/40 R X |

Primary Examiner—William M. Shoop, Jr.
Assistant Examiner—W. E. Duncanson, Jr.
Attorney, Agent, or Firm—Kenyon & Kenyon

[57] ABSTRACT

The integral part of a power controller and of a PI speed controller is formed by a common integrator, both controllers always being engaged. With this linear interlinking of the two controllers, stability can be assured in the two limit cases of the network (rigid network and ohmic island) as well as practically in all cases in between.

4 Claims, 4 Drawing Figures

APPARATUS FOR CONTROLLING A TURBO GENERATOR

The present invention relates to an apparatus for controlling turbo generators with a speed and an output controller, each of which have integral behavior.

Such a control device is known from DE-OS No. 26 27 591. There, the speed and the output controller form separate units which are functionally independent of each other and follow each other in making available the controlled variable via a minimum value selection circuit. Thus, only one controller is engaged at a time, while the output variable of the disengaged controller is slaved to the leading controller by means of special limiter circuits over the entire operating range in order to avoid pulse-like control commands in the transition from the one to the other kind of control.

SUMMARY OF THE INVENTION

It is therefore an object of the present invention to provide a control device of the type mentioned above without a minimum value selection circuit or other switching between the output and the speed controller and to avoid the slaving of the respectively disengaged controller which often leads to dynamic problems.

The above and other objects of the invention are achieved by an apparatus for controlling turbo generators having a speed and a power controller, each of which have integral behavior, wherein the integral part of the speed and the power controller is formed by means of a common integrator, a signal derived from the power deviation acts via a first proportional member on the input of the common integrator, to which the speed deviation is fed additively and directly in addition, the speed deviation being fed in addition to the input of a second proportional member which forms the proportional amplification of the speed controller, the output signal of which is added to the output signal of the common integrator.

With such a structure of the control device, the advantage is obtained that both controllers always cooperate and the functions of the speed and output control which must be provided operationally, remain fully preserved so that the stability not only in the two limit cases of the network (ohmic island and rigid network) can be assured, but in practice also in all operating cases in between. If the network conditions change, the parameters of the output/speed control need not be readjusted and therefore, also a network monitoring circuit initiating such parameter readjustments becomes unnecessary.

BRIEF DESCRIPTION OF THE DRAWINGS

The invention will be explained in greater detail in the following detailed description, with reference to the drawings, in which.

DETAILED DESCRIPTION

Figure 1:
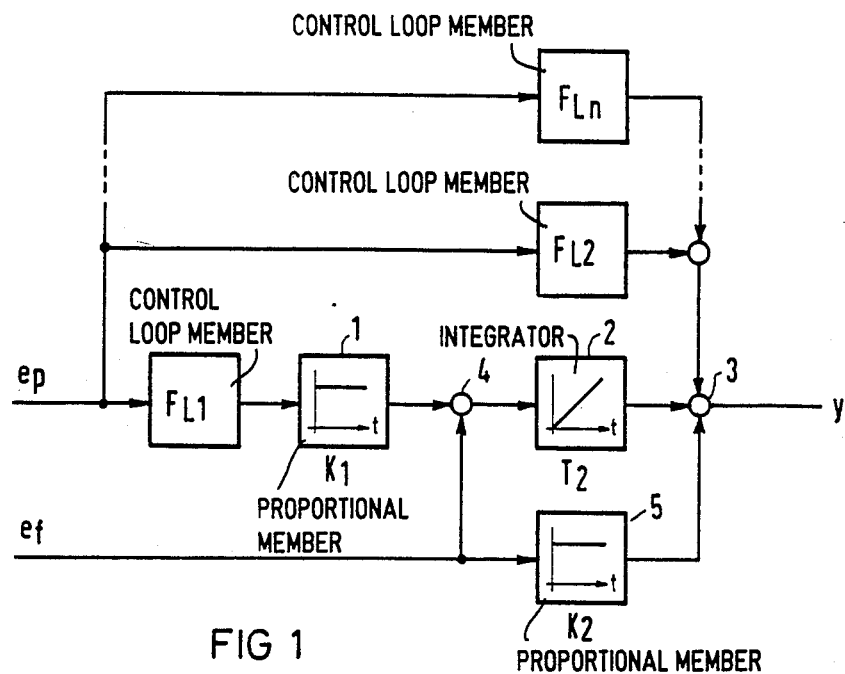
FIG. 1 shows the basic design of the control apparatus according to the invention for the combination of a general output controller with a speed controller exhibiting PI behavior.

In the presentation according to FIG. 1, the power output controller comprises a number of control loop members acted upon in parallel by the power deviation $e_p$, i.e., by the difference between a preset reference value and the actual value of the power delivered by the turbine, the control loop members having the general transfer functions FL2 to FLn, the output signals of which are combined in a sum signal. Parallel to these general control loop members is provided a further control branch which comprises the general control loop member with the transfer function FL1, a proportional member 1 with the gain $K_1$ and an integrator 2 with the integration time $T_2$. The sum signal of the control loop members with the transfer functions FL2 to FLn is added in a mixing stage 3 to the output signal of the integrator 2. In the case that the output controller shown in FIG. 1 is to be designed specifically as a PID controller, the controller branch containing the integrator 2 would make available the integral part, and two branches arranged parallel to this branch would contain a P or a PD member, respectively.

The integrator 2 is now utilized simultaneously for the construction of a speed or frequency controller in that the speed or frequency deviation signal $e_f$ and the frequency deviation $e_f$ amplified by a proportional member 5 with the gain $K_2$ is additively fed to the mixing stage 3 by means of a mixing stage 4. With respect to the frequency deviation $e_f$, the arrangement consisting of the integrator 2 and the proportional member 5 therefore represents a controller with PI behavior, while the power deviation $e_p$ is processed by a power controller with a transfer behavior which can be chosen differently as desired. In the output signal y of the speed/power controller, the output signals of two different controller types are therefore superimposed or linked to each other linearly, the integral parts of the two controllers being formed by the integrator 2 common to them.

Figure 2:
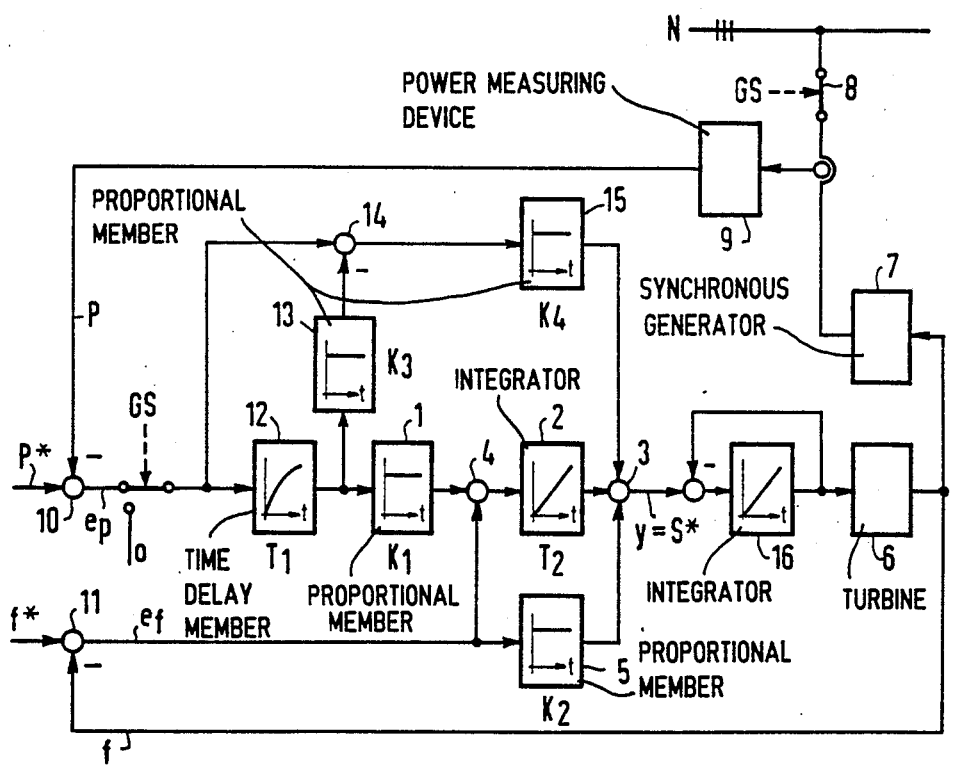
FIG. 2 shows a special embodiment of the invention in conjunction with a turbo generator.

FIG. 2 shows a more detailed embodiment for controlling a turbo set consisting of a turbine 6 and a synchronous generator 7 coupled thereto, which feeds into a network designated with N via a generator switch 8. A power measuring device 9 is provided with which the power P delivered by the generator is measured and compared in a mixing stage 10 with a preset reference value P*, so that the signal $e_p$ is the power deviation from the preset reference value P*. The power deviation signal $e_p$ is fed to the power controller via a switch which can be actuated by the signal GS; also the generator switch 8 is actuated by this signal. For running the turbine up to synchronization with the network N, the signal GS is operative, whereby the generator switch 8 is opened and the input signal of the power controller is given the value 0 so that only the speed controller is operative while, with the generator switch 8 closed, the power deviation signal $e_p$ acts on the input of the power controller. As a further input variable for the speed/power controller, the speed and frequency deviation $e_f$ is formed in a further mixing stage 11, to which a frequency reference value f and an actual frequency value f are fed which correspond to the frequency of the voltage delivered by the synchronous generator 7. The speed/power controller, the control loop numbers of which, designated with 1 to 5, agree with the elements designated in the same manner in FIG. 1 has, in the example shown in FIG. 2, a time delay member 12 with a time constant $T_1$, to which the power deviation $e_p$ is fed. The output signal of the time delay member 12 is fed to the inputs of the proportional member 1 and a further proportional member 13 with the gain $K_3$, the output signal of which is subtracted in a mixing member 14 from the power deviation $e_p$. The output signal of the mixing stage 14 is fed to the mixing stage 3 additively via a proportional member 15 with a gain $K_4$, to the two further inputs of which, the output signal of the integrator 2 and the output signal of the proportional member 5 are connected according to the arrangement shown in FIG. 2. The sum output signal y of the mixing stage 3 serves as the setting reference value S* for a setting control subordinated to a speed/power controller which is indicated by the fed-back integrator 16 and causes a corresponding opening of the turbine setting valves.

With the structure of the power controller shown in FIG. 2, a transfer function can be realized which corresponds in its numerator to the denominator of the transfer function of the turbo generator 6, 7 and thereby ensures a dynamically stable behavior. From a control point of view, the turbo generator comprising the turbine 6 and the synchronous generator 7 represents a second order resonator which is defined by the characteristics resonance frequency and damping. The time constant $T_1$ of the time delay stage 12 of the power controller is therefore designed so that it corresponds to the reciprocal value of the resonance frequency of the turbo generator, while for weighting the output signal of the time delay stage by the proportional member 13, $K_3 = 1 - 2D$ applies, where D is the damping of the turbo generator. If now the integration time $T_2$ of the common integrator 2 is made in accordance with $T_2 = K_1/K_4 \cdot T_1$, it can be shown that for the transfer function $F_L$ of the power controller with s as the Laplace operator, $F_L = K_4 \cdot (1 + 2DT_1 s + T_1^2 s^2)/((1 + T_1 s) \cdot T_1 s)$ The gain $K_4$ of the proportional stage 15 is selectable and is set in accordance with the desired transient behavior, while the so-called primary influence steady-state (static) i.e., the dependence of the power delivered by the turbo generator on the line frequency can be set by $K_1$. The PI speed controller consisting of the integrator 2 and the proportional member 5 has the transfer function $F_D = K_2 (1 + K_2 \cdot T_2 s)/K_2 \cdot T_2 s$, where the gain $K_2$ is selectable here.

If the speed/power controller is to be constructed according to FIG. 2, by means of the structure shown in FIG. 1, with non interlinked parallel branches, then the control loop stage preceding the proportional stage 1 must have the transfer function $F_{L1} = 1/(1 + T_1 \cdot s)$ and, as an only a control loop number would have to be provided with the transfer function $F_{L2} = K_4(2D + T_1 \cdot s)/(1_R + T_1 s)$. The design of the power controller shown in FIG. 2, however, has the advantage that only a single time delay member with the time constant $T_1$, namely, the time delay stage 12 has to be realized which is matched to the reciprocal value of the resonance frequency of the turbo generator.

Figure 3:
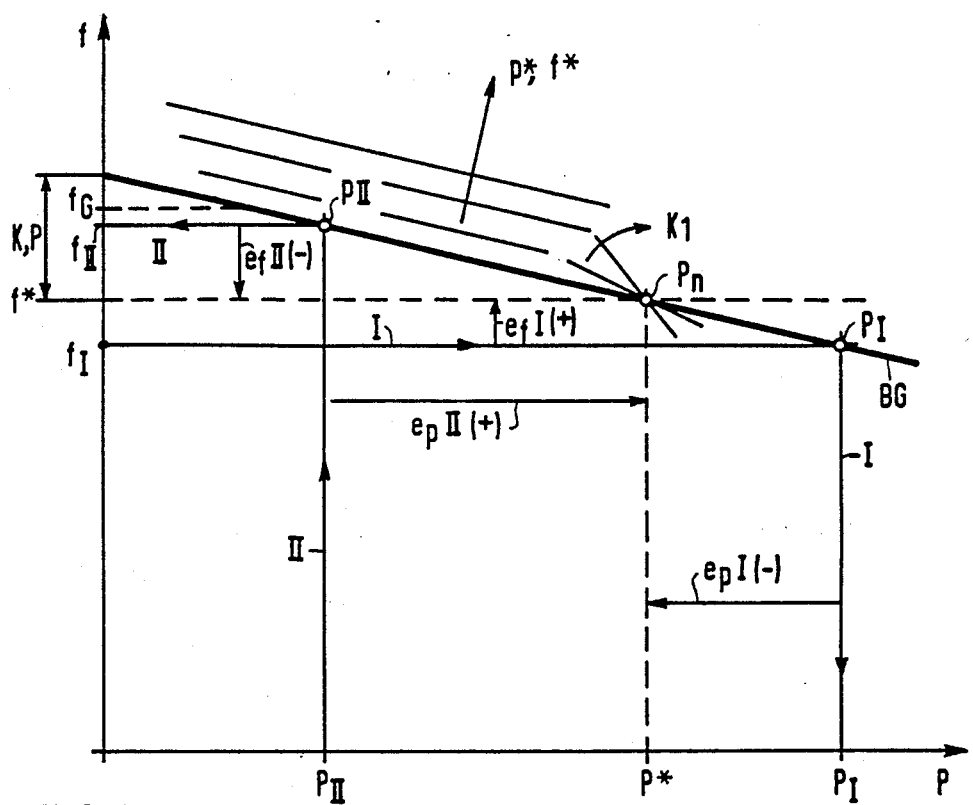
FIG. 3 is a diagram regarding the operating behavior of the speed/output controller according to the invention.

FIG. 3 shows a diagram of the operating behavior of the turbo generator equipped with the speed/power controller according to the invention. A stable operating state settles if the input variable of the common integrator reaches the value 0, i.e., if $$e_p \cdot K_1 + e_f = 0 \text{ and}$$

$$f = -K_1 P + f^* + K_1 \cdot P^* \quad (1)$$

where f and P, respectively, are the actual values and f* and P*, respectively, are the desired values of the frequency and the active power. Equation (1) is represented in the diagram of FIG. 3 by the straight operating line BG. By increasing the proportionality factor $K_1$, the straight operating line BG can be slewed as indicated, while a corresponding parallel shift of this straight operating line would result if the parameters P* and f* are changed. For the case that the turbo generator in conjunction with other power generators works into a common network, the frequency of which agrees with the frequency reference value f* specified for the turbo generator, the steady-state operating point Pn adjusts itself, at which the active electric power delivered by the turbo generator agrees with the predetermined power reference value P*. The frequency and power deviation are equal to 0. If, due to a sudden power demand, the network frequency f drops, for instance, to the value $f_1$, a new operating point $P_I$ adjusts itself, at which the turbo generator furnishes, in addition to the power reference value P*, a power contribution for the network support, which depends on the value determining the primary influence (static). At the same time, a positive frequency deviation $e_f I$ (+) occurs which compensates the negative power deviation $e_p I$ (−), multiplied by the factor $K_1$, in the input circuit of the integrator 2. Similarly, a corresponding reduction of the power delivered by the turbo set results for a frequency increase of the combined network than is prescribed for it by the reference value P*.

In the case that the turbo generator works into an "island" network, i.e., not in conjunction with other power generators, the power taken by consumers connected to this island network is the independent variable and that operating point $P_{II}$ adjusts itself, for instance, on the straight operating line BG, to which the frequency $f_{II}$ corresponds. Thus, a positive power deviation $e_p II$ (+) and a negative speed or frequency deviation $e_f II$ (−) are obtained, the influences of which again cancel in the input circuit of the integrator 2. Through the action of the common central integrator 2 it is therefore always assured that stationary operating points $P_n$, $P_I$, $P_{II}$ are reached.

If the frequency increase beyond the reference frequency f* which takes place in island operation according to the straight operating line BG due to excessive load shedding cannot be tolerated, it is advisable to provide for a certain limit value $f_G$ in order to limit the frequency or speed of the turbine.

Figure 4:
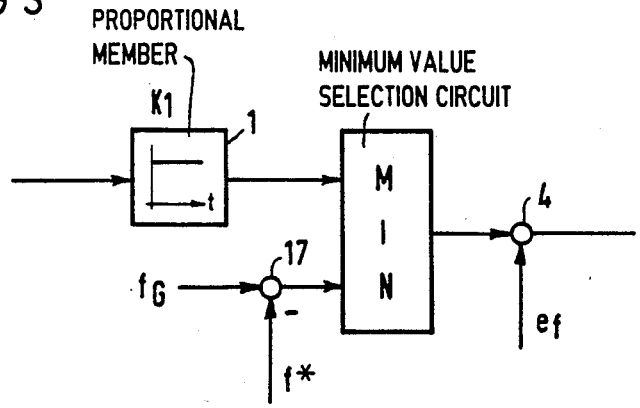
FIG. 4. shows a supplementary device for limiting the speed of a turbine.

Instead of employing a special limit control for these cases, this can be accomplished substantially more simply by the supplemental device shown in FIG. 4, according to which, between the proportionality stage 1 and the summing stage 4, a minimum-value selection circuit designated with MIN is provided which is acted upon by the output signal of the proportionality stage $K_1$ and by the output signal of a mixing member 17 to which the difference between the constant frequency limits $f_G$ and the reference value f* is fed on the input side. Since the minimum-value selection circuit MIN passes only the smaller of its input signals, the supplement shown in FIG. 4 has the effect that the output signal of the adding member 17 is passed by the minimum value selection circuit from a given positive power deviation on instead of the output signal of the proportionality member $K_1$, so that at the output of the mixing stage 4, a signal of the magnitude $f-f_G$ is obtained, by which the integrator 2 is readjusted until this signal has become 0, i.e., $f=f_G$. Thus, the frequency/power control is transferred into a speed control with integral action to the specified frequency value $f_G$, if the delivered power drops below a given value, whereby the turbine speed can be limited reliably.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An apparatus for controlling a turbo generator having a speed and a power controller, each of which have integral behavior, comprising:
   common integrator means for the speed and the power controller (for providing the integral behavior;
   a first proportional member means having as an input a signal derived from a power deviation signal representing a difference between a preset reference power value and an actual power value and an output coupled to an input of the common integrator means, a speed deviation signal comprising the difference between a reference speed value and an actual speed value being coupled additively to said common integrator means input; and
   a second proportional member means having as an input the speed deviation signal for forming a proportional amplification of the speed controller, the output signal of said second proportional member means being added to the output of the common integrator means.

2. The apparatus recited in claim 1, further comprising:
   a first-order time delay means having a time constant corresponding to the reciprocal value of a resonance frequency of the turbo generator coupling the power deviation signal to the first proportional member means;
   a third proportional member means for weighting an output signal of the time delay means in dependence on a damping characteristic of the turbo set, and means for subtracting the input signal of the time delay means from said weighted time delayed output signal to form a difference signal, and fourth proportional member means having said difference signal as an input for forming the proportional amplification of the power controller;
   an output signal of the fourth proportional member means being added to the output signal of the common integrator means which has an integration time which is proportional to the time constant of the time delay means and is inversely proportional to the gain of the first proportional member means and inversely proportional to the gain of the fourth proportional member means.

3. The apparatus recited in claim 1, wherein the output signal of the first proportional member means is supplied to the input of the integrator means via a first input of a minimum value selection circuit means, a difference signal representing a difference between a constant speed limit and a desired speed value of the turbo generator being coupled to a second input of the minimum value selection means.

4. The apparatus recited in claim 1, wherein the input of the power controller is switched off simultaneously with the opening of a switch connecting the generator to an electrical network.

* * * * *